United States Patent
McCarty

[11] 3,877,688
[45] Apr. 15, 1975

[54] SPRING CLIP FOR SPROCKET OR ROLLER CHAIN

[75] Inventor: Almon Minor McCarty, Montour Falls, N.Y.

[73] Assignee: Borg-Warner Corporation, Chicago, Ill.

[22] Filed: Nov. 23, 1973

[21] Appl. No.: 418,535

[52] U.S. Cl. .................. 267/159; 74/258; 74/254; 85/8.8; 198/189
[51] Int. Cl. ............................................. F16g 13/08
[58] Field of Search ...... 267/159; 74/254, 258, 251; 85/8.8; 24/111; 198/189

[56] References Cited
UNITED STATES PATENTS

| | | | |
|---|---|---|---|
| 312,555 | 2/1885 | Crocker | 74/258 |
| 624,492 | 5/1899 | Hoffmonn | 74/258 |
| 1,802,829 | 4/1931 | Pierce, Jr. | 85/8.8 |
| 1,839,943 | 1/1932 | Barnes | 85/8.8 |
| 2,466,639 | 4/1949 | Focke et al. | 85/8.8 |
| 2,775,156 | 12/1956 | Inse et al. | 74/254 |

*Primary Examiner*—James B. Marbert
*Attorney, Agent, or Firm*—Aubrey L. Burgess

[57] ABSTRACT

A spring clip for maintaining sprocket or roller chain elements in assembled relationship. The clip is a resilient member having an arched center portion when viewed in elevation and spaced openings when viewed in plan. Pressure applied to the arched center portion flattens the member, so that the openings encircle an adjacent pair of link pins. Release of the pressure permits the clip to return to substantially original shape, so that the openings resiliently engage the pins, retaining the chain parts in assembled relationship.

7 Claims, 10 Drawing Figures

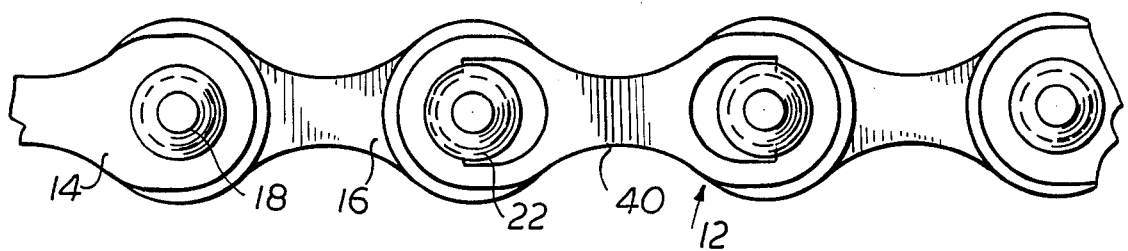
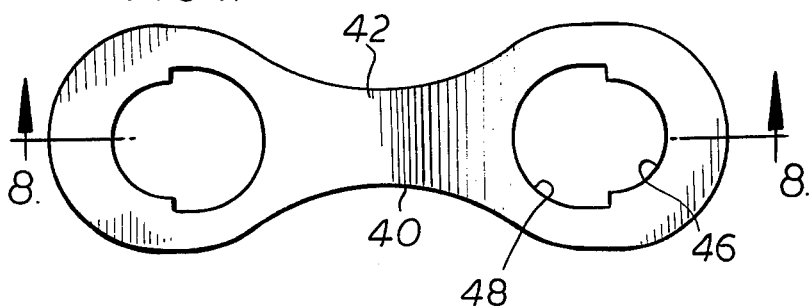
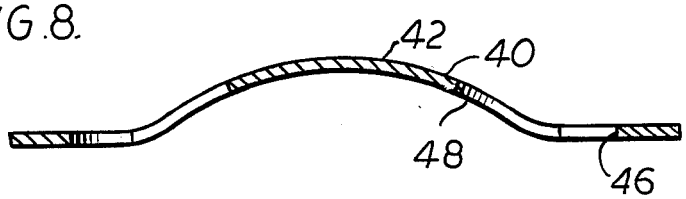
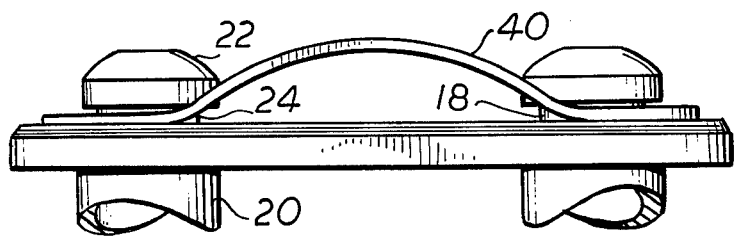
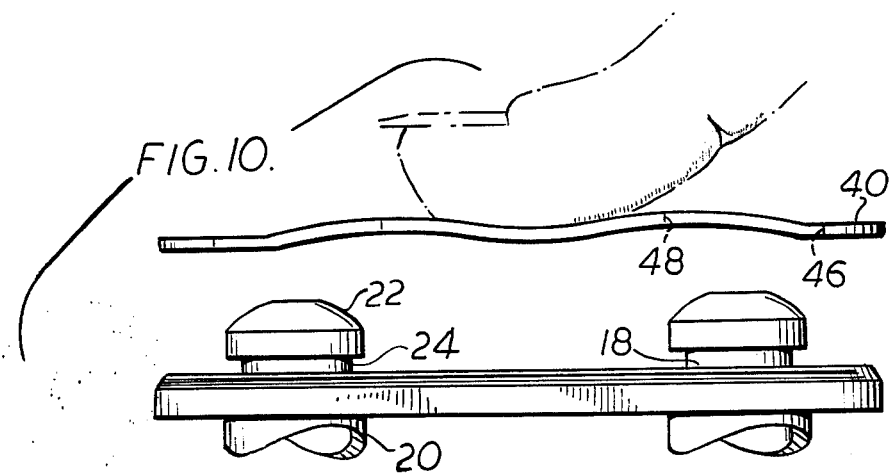

SPRING CLIP FOR SPROCKET OR ROLLER CHAIN

BACKGROUND OF THE INVENTION

The invention relates to a device, commonly known as a spring clip, for maintaining sprocket or roller chain parts in assembled relationship. Prior art spring clips are generally flat, elongated, loop-like members having an elongated central opening or eye, which are pushed against chain pins, so as to spread the legs and engage the pins with the eye. To remove the clip a tool such as a screwdriver is used to spread the legs to disengage the clips from the pins. Objections to these clips are many. Vibration of the chain frequently produces water so that the chain flys apart during use. Injury to workman can occur if a screwdriver slips during removal of clip.

There are also multiple part prior art clips which require more parts, more assembly time, and thus increased cost.

According to this invention, a spring clip is provided which is simple in construction, positive in retaining action, and easy to install. Specifically, the clip comprises an elongated resilient member with an arched central portion and openings spaced apart a distance corresponding generally to the spacing of the pins of a chain. When pressure is applied to the arched portion with the clip in juxtaposition to the pins of a chain, the clip is pressed into a substantially flat configuration with each opening encircling a pin. Release of the pressure permits the clip to substantially return to its original configuration wherein each pin is resiliently engaged by the wall of an opening. Removal of the clip is accomplished by reversing the steps of assembly.

THE DRAWINGS

FIGS. 6 to 10 are figures similar to FIGS. 1 to 5 illustrating another embodiment of the invention.

DETAILED DESCRIPTION

Figure 1:
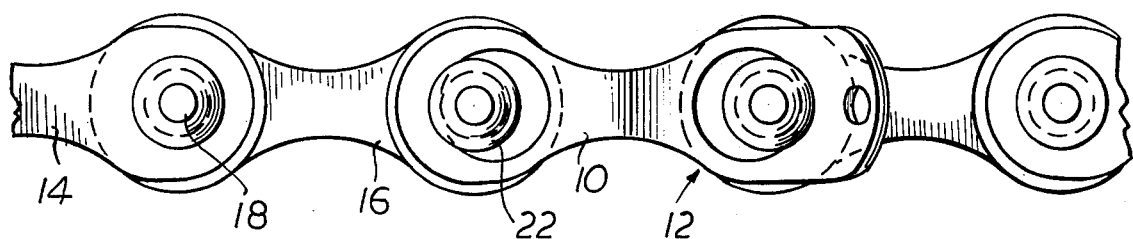
FIG. 1 is a side elevational view of several links of a conventional roller chain showing one form of a spring clip applied to one side of the chain.
Figure 2:
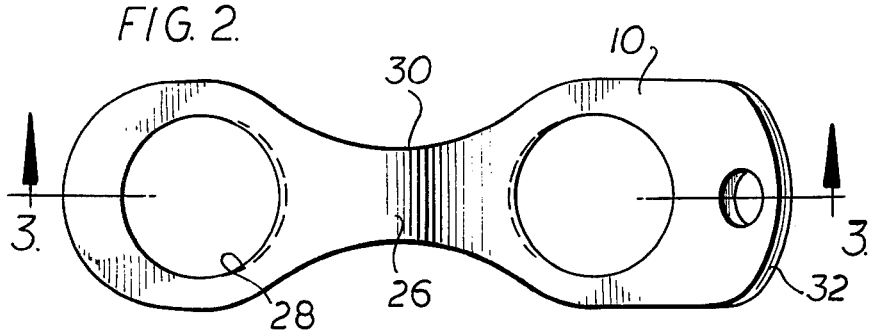
FIGS. 2 and 3 are plan and side views, respectively of a spring clip as illustrated in FIG. 1.
Figure 3:
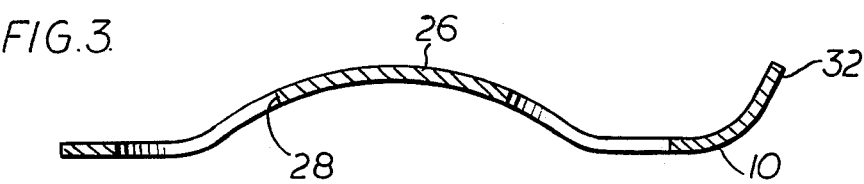
Figure 4:
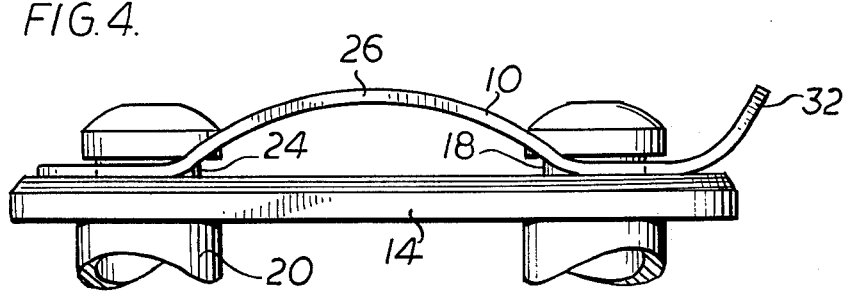
FIG. 4 is a view illustrating the spring clip of FIGS. 1 to 3 in operative position.
Figure 5:
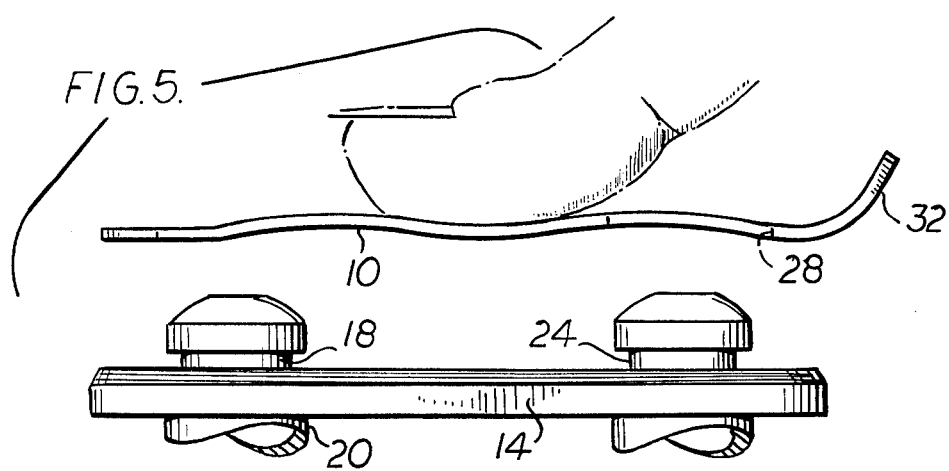
FIG. 5 shows how the spring clip of FIG. 1 to 4 is applied to one side of a chain.

Referring now to the drawings, one embodiment of the invention is illustrated in FIGS. 1 to 5 inclusive. This first embodiment comprises a spring clip, generally identified with the reference number 10, especially usable with a roller or sprocket chain 12. The chain 12 comprises alternate pin links 14 and roller links 16 joined by chain pins 18 and spaced by rollers 20.

In some constructions, each pin link is equipped with a spring clip to retain the parts in assembled relationship, while in other constructions, only one link is so equipped, with the projecting ends of the pins of the other links being riveted or peened over at assembly, as indicated at 22 in FIG. 1, whereby to permanently retain the parts in assembled relationship. The spring clip in the latter case is used to join the ends of a length of chain in order to produce a continuous chain. When the spring clip is used, the ends of the pins 18 are preferably grooved, as at 24, the grooves being preferably located just outwardly of the outward face of the link 14 and of a width substantially equal to the thickness of the spring clip 10.

The spring clip 10 is an elongated member of resilient material, such as steel, having a central, arched portion 26 and spaced openings 28. The arched position may be reduced in width as at 30, if so desired, in order to economize on material. An end tab portion 32 may also be provided for ease of gripping by the fingers, pliers or other suitable tool when removing the clip. However, the tab may be eliminated if desired. The clip may be stamped from sheet material and then shaped to provide the arched portion and the upwardly turned top portion. As stamped, the openings 28 are generally elliptical in shape; when in finished form, they appear to be generally circular. The openings are spaced a distance whereby when the clip is in assembled relationship with the pins 18, the wall of each opening will resiliently engage the groove 24 in the head of a grooved pin 18.

To use the clips of this invention, the chain is assembled so that the headed pins extend to one side; a clip is placed with an opening engaging a pin head and the arch of the clip faces outwardly of the chain; pressure is applied to the arched portion of the clip in order to spread the openings so that they encircle the pins; pressure is released and the pins are engaged by the clips as it tends to return to substantially its original configuration. The tab portion of the clip is beneficial in handling the assembly and disassembly of the chain. To disassemble the chain, the steps are reversed.

In FIGS. 6 to 10 an alternate spring clip 40 is illustrated. The chain parts and the method of assembly and disassembly are the same as just described.

The clip 40 has a reduced central width arched portion 42 and spaced openings 44. These are different in shape than the construction of the first embodiment. Here the openings have end portions 46 of less size than the remainder 48. The radius of the end portions 46 may be substantially the same as the radius of the pin at the groove and which is to be engaged by the clip.

In both embodiments, the spring clip provides a positive connection for the chain; one which is superior in performance to those of the prior art constructions, yet one which is simple in construction and easy to use. No tools are required to use the clip in the assembly and disassembly of a chain.

While the embodiments illustrated and described refer to the use of a spring clip engaging a grooved, headed pin, it is contemplated within the scope of this invention to provide serrated openings in the clips which will frictionally engage the projecting ends of uniform or substantially uniform diameter pins to provide the assembled chain. While this construction is not as positive as that described with reference to the preferred embodiment, nevertheless it can be used in light-load application. The method of assembly and disassembly and also the basic construction of the clip is essentially the same.

I claim:

1. In combination with a chain having a plurality of links connected by chain pins with said pins having end portions extending outwardly of said links, a spring clip for application and removal from said end portions of a pair of adjacent chain pins, which clip comprises a resilient element having a pair of spaced openings and an arched center portion; said openings encircling the end portions of said pins when pressure is applied to the arched central portion tending to flatten the clip; said clip openings frictionally engaging end portions of said pins upon release of said pressure; said clip maintaining said links in assembled relationship.

2. The combination as recited in claim 1 wherein said pins are grooved adjacent their ends and portions of said clips are received in said grooves.

3. The combination as recited in claim 1 wherein said openings are generally circular when viewed in plan.

4. The combination as recited in claim 1 wherein said openings are elongated and have portions of different sizes.

5. The combination as recited in claim 4 wherein the pin engaging portions are smaller than the remainder.

6. The combination as recited in claim 1, further including an end tab portion on said clip for ease of removal of said clip from said pins.

7. A method of assemblying chain parts comprising spaced pins and links, the steps which comprise;

providing a spring clip having spaced openings and an arched central portion;

assembly said links and said pins with the ends of said pins extending outwardly of said links;

placing a clip with its openings each in juxtaposition to an outwardly extending pin with the arch of the central portion facing outwardly of said links;

applying pressure to said arched portion of said clip to spread said openings and thus encircle said pins; and releasing said pressure to resiliently engage said pins with said openings.

* * * * *